Nov. 10, 1925.  
E. MUEHLECK  
1,561,347  
INSULATED RAIL JOINT  
Filed May 4, 1925
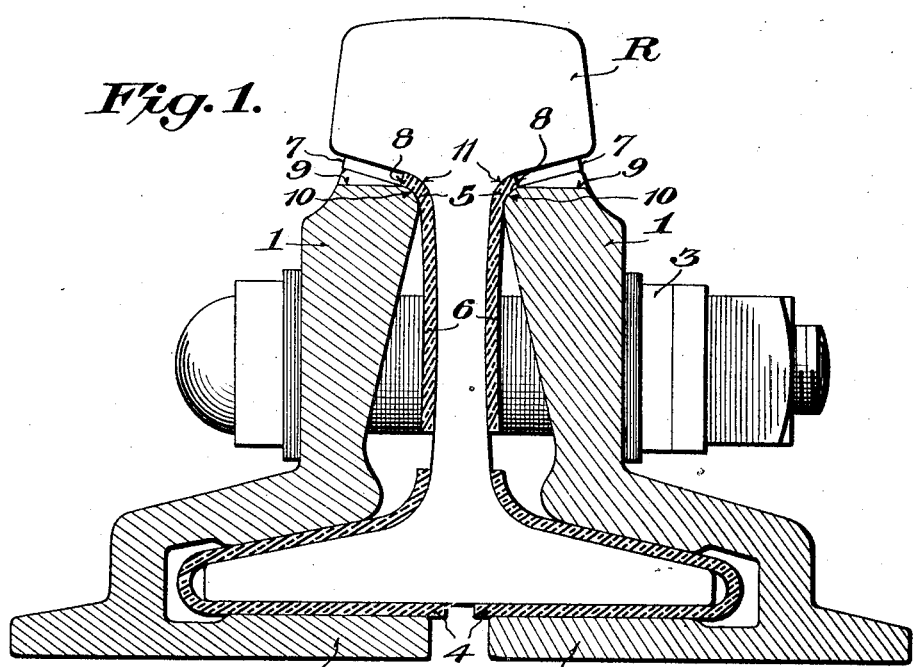
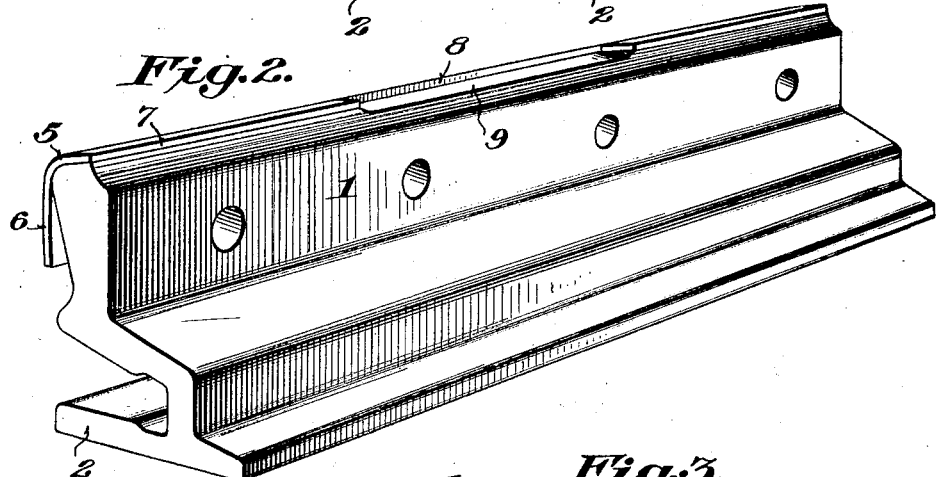
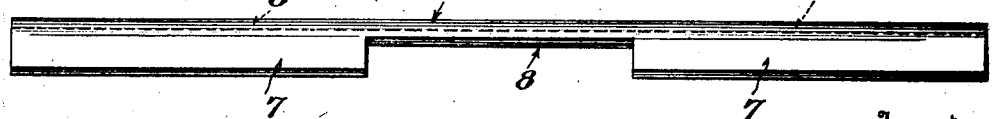

Patented Nov. 10, 1925.

1,561,347

UNITED STATES PATENT OFFICE.

ERNEST MUEHLECK, OF BROOKLYN, NEW YORK, ASSIGNOR TO THE RAIL JOINT COMPANY, OF NEW YORK, N. Y., A CORPORATION OF NEW YORK.

INSULATED RAIL JOINT.

Application filed May 4, 1925. Serial No. 27,924.

*To all whom it may concern:*

Be it known that I, ERNEST MUEHLECK, a citizen of the United States, residing at Brooklyn, Kings County, State of New York, have invented certain new and useful Improvements in Insulated Rail Joints, of which the following is a specification.

This invention relates to an improvement in insulated rail joints which has for its principal object the relieving of the head insulation at the center of the joint from the excessive wear and destructive forces which are imposed upon that part of the insulation of a rail joint.

Different expedients have been used for increasing the life of the head insulation of a rail joint, particularly at the center of the joint where the insulation fails most quickly because of the hammering thereof at the ends of the rails. The present invention not only contemplates a construction which will entirely relieve the head insulation at the center of the joint from undue wear or quick destruction, but also provides for the joint bar taking a loading engagement at the head fillets of the rails at the center of the joint, with the result of more readily maintaining the joint "high" at the center and thus maintaining better surface for the track through the joint.

The improvement constituting the present invention is necessarily susceptible of structural modifications without departing from the spirit or scope thereof but a practical form thereof is illustrated in the drawings wherein Figure 1 is a vertical transverse sectional view illustrating the improvement claimed herein.

Figure 2 is a perspective view of a joint bar of continuous type shown fitted with the improved head insulation and modified to cooperate therewith and provide a head fillet bearing for the joint bar at the center of the joint.

Figure 3 is a top plan view of a head piece of insulation showing the central cut away portion thereof to leave at the center part of the insulation a head fillet section.

Like references designate corresponding parts throughout the several figures of the drawings.

The improvement contemplated by the present invention is applicable to any type of joint bar employed in the fabrication of an insulated rail joint, so for illustrative purposes there is shown in the drawings a pair of joint bars 1—1 of the well known continuous type having the usual rail base supporting flanges 2 and clamped upon the rail R and in the fishing spaces by the usual insulated joint bolt structures 3. A well known base insulation designated generally by the reference numeral 4 is shown in the drawings as associated with the base part of the rail and providing a complete insulation between the rail base flanges and the foot flanges and base flanges of the joint bars. In addition to the base insulation or its equivalent, the present invention provides for a modification of the rail head-unit of insulation designated by the reference numeral 5 and which is interposed between the head of each joint bar and the undersides of the heads of the rails. The insulation head unit 5 is made of fiber or equivalent insulating material and is of an angle formation, the same being provided with a depending skirt portion 6 which lies between the joint bar and the web of the rail and preferably interlocks with the joint bolts, and the upper outturned head flanges 7 which lies between the rails and the head of the bar.

According to the present invention the upper flange 7 of the insulation head unit 5 is cut away at its central or intermediate portion as at 8 for a sufficient distance at both sides of the center of the joint to leave the overhanging portions of the rail heads at the center of the joint entirely free of contact with the fiber or insulation. And, coordinated with the central cut away part 8 of the insulation head unit 5 is the feature of a clearance recess 9 which is formed in the central portion of the head of the joint bar by cutting away or recessing the top edge metal of the joint bar at such central or intermediate portion. It will be observed that the clearance recess 9 in the head of the bar and the cut away central part 8 on the head or flange 7 of the insulation unit 5 are in registration so that there will be no contact at the center of the joint between either the head of the bar or the upper flange 7 of the insulation head unit with the fishing bearings at the undersides of the rail heads. However, provision is also made for each joint bar having a loading engagement with the rail ends within the central part of the joint and this is provided for by forming each joint bar at its upper inner corner with a bearing corner 10 having a loading engagement with the rail at the head fillet 11 thereof, with the insulation of course interposed.

From the construction described it will be seen that the present improvement utilizes a "head free" feature for the bar at the center of the joint, in combination with a cut away part of the insulation in the same locality. The central head free part of the bar and the intermediate cut away part of the insulation take a fillet bearing only against the rail ends within the center of the joint and the remainder of the bar and the insulation take full head fishing-bearings. The advantages of such a construction are two-fold. In the first place, the head piece of insulation usually subjected to the greatest wear is beneath the rail ends within the center of the joint, but the present invention entirely removes that part of the insulation, thus greatly prolonging the life of the head sections of insulation within the joint. The other feature of advantage arising from the construction described is that the head-free feature for the central part of the joint bar permits of bringing the central part of the joint bar into loading engagement with the rail ends at the head fillets 11 thereof so that the loading and deflection forces to which a rail joint is subjected at the central part thereof may be assimilated more effectively and advantageously than where full fishing-bearings are provided throughout the joint including the central part thereof.

Furthermore, the described construction provides a rail joint wherein, upon the tightening of the bolts, the joint bars tend to move upwardly and outwardly at the rail head fillets 11 resulting in "jacking up" the rail ends within the joint and maintaining them in a condition which is usually referred to as a "high joint", thus keeping a good surface for the track through the joint.

From the foregoing it is through that the construction and advantages of the improvement will now be understood without further description and it will also be understood that changes in the form, proportion and minor details of construction may be resorted to without departing from the spirit of sacrificing any of the advantages of the invention.

I claim:—

1. An insulated rail joint including a head unit of insulation free of contact with the under sides of the rail heads at the central portion of the joint, and contacting with the under sides of the rail heads throughout the remainder of the joint.

2. An insulated rail joint including a joint bar free of contact with the undersides of the rail heads at the central portion of the joint, and a head unit of insulation also free of contact with the same parts of the rail heads.

3. An insulated rail joint including a joint bar having a loading engagement with the head fillet only of the rails at the central portion of the joint, and a fishing engagement with the undersides of the rails throughout the remainder of the joint, and a head unit of insulation interposed between the bar and the rails and having a clearance from the fishing surfaces at the undersides of the ends of the rails within the central part of the joint.

4. An insulated rail joint including a joint bar having a loading engagement with the head fillets only of the rails within the central part of the joint and full fishing bearings with the undersides of the rail heads throughout the remainder of the joint, and a head unit of insulation interposed between the joint bars and the rails and having a central portion thereof cut away to have clearance from the ends of the rails within the central part of the joint.

5. An insulated rail joint including a joint bar having a clearance recess in the central part of its head and a head unit of insulation having a cut away portion over said recess.

6. An insulated rail joint including a joint bar provided at the top edge of its head with a centrally located clearance recess, and a head unit of insulation provided with an upper flange having its central part cut away in the location of the recess in the bar head.

7. An insulated rail joint including a joint bar having a loading engagement with the head fillets of the rail ends at the center of the joint and also provided with a centrally located recess in the top edge of its head, and a head unit of insulation interposed between the bar and the rails and provided with a centrally located cut away portion.

In testimony whereof I hereunto affix my signature.

ERNEST MUEHLECK.